(12) United States Patent
Chea (10) Patent No.: US 6,823,001 B1
(45) Date of Patent: Nov. 23, 2004

(54) DUAL STAGE COMMUNICATION PROCESSOR

(75) Inventor: Woody A. Chea, St. Augustine, FL (US)

(73) Assignee: Bitrage, Inc., St. Augustine, FL (US)

( * ) Notice: Subject to any disclaimer, the term of this patent is extended or adjusted under 35 U.S.C. 154(b) by 911 days.

(21) Appl. No.: 09/583,912

(22) Filed: May 31, 2000

(51) Int. Cl.[7] .............................. H04B 1/38; H04L 5/16
(52) U.S. Cl. ...................... 375/219; 375/220; 375/225; 375/355
(58) Field of Search ................................ 375/219, 220, 375/225, 229, 257, 355, 371, 344, 376, 316

(56) References Cited

U.S. PATENT DOCUMENTS

| | | |
|---|---|---|
| 2,733,296 A | 1/1956 | Maggio |
| 2,833,861 A | 5/1958 | Anderson et al. |
| 3,843,844 A | 10/1974 | Schumperli |
| 3,989,907 A | 11/1976 | Chambers, Jr. |
| 4,056,688 A | 11/1977 | Stiefel |
| 4,277,655 A | 7/1981 | Surprenant |
| 4,580,260 A | 4/1986 | Blackburn et al. |
| 4,638,473 A | 1/1987 | Cooperman et al. |
| 4,670,886 A | 6/1987 | Newcombe, Jr. et al. |
| 4,677,687 A | 6/1987 | Matsuo |
| 4,837,788 A | 6/1989 | Bird |
| 4,870,370 A | 9/1989 | Hedberg et al. |
| 4,964,116 A | 10/1990 | Measor |
| 5,152,002 A | 9/1992 | Leslie et al. |
| 5,179,720 A | 1/1993 | Grube et al. |
| 5,195,132 A | 3/1993 | Bowker et al. |
| 5,367,273 A | 11/1994 | Georger et al. |
| 5,422,950 A | 6/1995 | Miller et al. |
| 5,483,372 A | 1/1996 | Green, Jr. |
| 5,528,281 A | 6/1996 | Grady et al. |
| 5,537,680 A | 7/1996 | Bruno |
| 5,541,640 A | 7/1996 | Larson |
| 5,557,669 A | 9/1996 | Perry et al. |

(List continued on next page.)

OTHER PUBLICATIONS

"Pulse–Code Modulation (PCM)", Roger L. Freeman, Telecomunnications System Engineering, 3rd Edition, (1989), (1996), pp. 382–392.

"Introduction to Transmission for Telephony", Roger L. Freeman, Telecomunnications System Engineering, 3rd Edition, (1989), (1996), pp. 181–195.

"Exchange Location", Roger L. Freeman, Telecomunnications System Engineering, 3rd Edition, (1989), (1996), pp. 220–237.

(List continued on next page.)

Primary Examiner—Khai Tran
Assistant Examiner—Qutub Ghulamali
(74) Attorney, Agent, or Firm—Pillsbury Winthrop LLP (57) ABSTRACT

A communications processor is presented that is capable of receiving a potentially degraded data transmission signals operating at high transmission rates and generating an improved data transmission signal in a manner that allows the signals to be transmitted over longer distances than is otherwise possible using conventional methods. The communications processor includes a decoding mechanism configured to compensate for amplitude and phase distortions of the data transmission signal, to split the corrected data signal into component data signals, to generate a data clock reference signal based on the data transmission signal and the external clock reference signal, and to convert the component data signals into digital component data signals synchronized to the data clock reference signal. The communications processor further includes an encoding mechanism configured to receive the digital component data signals and the data clock reference signal and to convert the digital component data signals into analog component data signals. The communications processor then selectively outputs at least one of the analog component data signals as the improved data transmission signal.

20 Claims, 5 Drawing Sheets

U.S. PATENT DOCUMENTS

| | | | |
|---|---|---|---|
| 5,557,670 A | | 9/1996 | Perry et al. |
| 5,621,455 A | | 4/1997 | Rogers et al. |
| 5,625,404 A | | 4/1997 | Grady et al. |
| 5,708,703 A | | 1/1998 | Nagaraj |
| 5,734,643 A | | 3/1998 | Rondeau |
| 5,751,114 A | | 5/1998 | Dingsor |
| 5,751,338 A | | 5/1998 | Ludwig, Jr. |
| 5,761,194 A | | 6/1998 | Bahlenberg |
| 5,761,245 A | | 6/1998 | Haukkavaara et al. |
| 5,778,303 A | | 7/1998 | Shinozaki et al. |
| 5,786,844 A | | 7/1998 | Rogers et al. |
| 5,793,759 A | * | 8/1998 | Rakib et al. ............... 370/342 |
| 5,801,695 A | | 9/1998 | Townshend |
| 5,809,075 A | | 9/1998 | Townshend |
| 5,821,987 A | | 10/1998 | Larson |
| 5,835,538 A | | 11/1998 | Townshend |
| 5,872,809 A | | 2/1999 | Batruni |
| 5,875,210 A | | 2/1999 | Brief et al. |
| 5,883,884 A | | 3/1999 | Atkinson |
| 5,898,761 A | | 4/1999 | McHale et al. |
| 5,903,372 A | | 5/1999 | Czerwiec |
| 5,905,781 A | | 5/1999 | McHale et al. |
| 5,940,403 A | | 8/1999 | Williams |
| 5,963,549 A | | 10/1999 | Perkins et al. |
| 5,978,371 A | | 11/1999 | Mason, Jr. et al. |
| 6,016,304 A | | 1/2000 | Kyle et al. |
| 6,178,198 B1 | * | 1/2001 | Samueli et al. ............. 375/214 |
| 6,400,415 B1 | * | 6/2002 | Danielsons ................. 348/608 |
| 6,449,308 B1 | * | 9/2002 | Knight et al. ............... 375/212 |
| 6,463,109 B1 | * | 10/2002 | McCormack et al. ........ 375/355 |

OTHER PUBLICATIONS

"Digital Transmission Systems", Roger L. Freeman, Telecomunnications System Engineering, 3rd Edition, (1989), (1996), pp. 339–366.

"Introduction to Sonet", ww/tektronix.com/Measurement/App¯Notes/SONET/sonet.html, May 17, 2000, pp. 1–3.

"Sonet Telecommunications Standard Primer", www/tektronix.com.Measurement/App__Notes/SONET/sonet.html, May 17, 2000, pp. 1–3.

"DSO–DS3–Ditigal Signal Services Available Over T1, T2, and T3 Signaling Systems, Digital Signal Levels", http://mirrors.iquest,net/telco/EE535/hwk11cd95/catman/dslevels.html, May 15, 2000, pp. 1–2.

"DSO–DS3–Ditigal Signal Services Available Over T1, T2, and T3 Signaling Systems, DS1–Digital Signal Level 1", http://mirrors.iquest,net/telco/EE535/hwk11cd95/catman/ds1.html, May 15, 2000, pp. 1–11.

"DSO–DS3–Ditigal Signal Services Available Over T1, T2, and T3 Signaling Systems, DS2–Ditigal Signal Level 2", http://mirrors.iquest,net/telco/EE535/hwk11cd95/catman/ds2.html, May 15, 2000, pp. 1–2.

"DSO–DS3–Ditigal Signal Services Available Over T1, T2, and T3 Signaling Systems, DS2–Ditigal Signal Level 2", http://mirrors.iquest,net/telco/EE535/hwk11cd95/catman/ds2.html, May 15, 2000, pp. 1–2.

"DOS–DS3–Ditigal Signal Services Available Over T1, T2, and T3 Signaling Systems, Pulse Stuffing or Justification", http://mirrors.iquest,net/telco/EE535/hwk11cd95/catman/stuffing.html, May 15, 2000, pp. 1–2.

DSO–DS3–Ditigal Signal Services Available Over T1, T2, T3 Signaling Systems, Jitter and Wander, http://mirrors.iquest,net/teleco/EE535/hwk11cd95/catman/jitter.html, May 15, 2000, p. 1.

DSO–DS3–Ditigal Signal Services Available Over T1, T2, and T3 Signaling Systems, DS1C–Digital Signal Level 1C, http://mirrors.iquest.net/telco/EE535/hwk11cd95/catman/ds1c.html, May 15, 2000, pp. 1–2.

* cited by examiner

DUAL STAGE COMMUNICATION PROCESSOR

BACKGROUND OF THE INVENTION

1. Field of the Invention

This invention generally relates to the field of communications. More particularly, the present invention relates to a communications processor that improves the quality of potentially degraded data transmission signals operating at high transmission rates.

2. Description of Related Art

Advances in computer capabilities as well as the unprecedented growth of Internet-related transactions have placed great demands on conventional communication infrastructures to convey information to subscribers at higher transmission rates with increased reliability and levels of service. Although conventional infrastructures communicate at higher transmission rates between networked hubs, such as DS-3 (e.g., or 45 Mbps) and OC-3 (e.g., or 155 Mbps), they are generally limited in their ability to accommodate such ample bandwidths between the hubs and subscribers. Such limitations arise from the infrastructures' inability to compensate for degradations encountered over conventional transmission media spanning distances of up to 18,000 ft. between the hubs and subscribers.

Consider, for example, how common carriers provide connectivity to subscribers. Typically, carrier hubs or central offices connect to subscribers via subscriber loop circuits. Subscriber loop circuits generally comprise 2-wire transmission paths (i.e., unshielded twister pairs—UTP), which support direct current signals, low frequency (<~200 Hz) analog signals, and voice band signals (~200 Hz—3.4 KHz). This range of frequencies limits the transmission rate at which digitally-encoded signals can be conveyed by the 2-wire transmission paths. Moreover, the longer the distances traversed by the signals on these 2-wire transmission paths, the more severe the degradation of the signals, thereby relegating communications to lower transmission rates. This assumes, of course, that the signals are pristine at inception; degraded signals may be subject to even lesser transmission rates to meet acceptable transmission error rates.

Recent efforts have sought to increase the digital transmission rates conveyed by the 2-wire transmission paths. Such efforts include the development of asymmetric digital subscriber lines (ADSLs). ADSLs implement a combination of channelization (e.g., discrete multi-tone DMT), coding (e.g., constellation/trellis encoding), and framing (e.g., super-framing) techniques to achieve upstream digital rates between 64–640 Kbps and download digital rates between 500 Kbps–7 Mbps. The ability to effectively attain these transmission rates, however, is very dependent on the distance the transmission must travel. Clearly, the longer the distance, the greater the distortion of the data at these transmission rates. Furthermore, ADSLs are sensitive to line-quality and line configurations. As a result, the higher transmission speeds are only available to subscribers having "clean lines" (i.e., no abrupt changes in line impedance due to wire gauge changes, bridge taps, coils, etc.) that are within very specific distances from the central office (e.g., 8,000–10,000 ft.).

Other efforts include performing line-conditioning to increase the line-quality of a local loop in the hopes of accommodating higher transmission rates. Such conditioning may include removing wire gauge changes, bridge taps, and coils, and other abnormalities. However, while such conditioning may provide moderate improvement in transmission speeds, it is time and labor intensive and line specific. In addition, much like ADSLs, improvements in transmission rates are acutely dependent on distance.

SUMMARY OF THE INVENTION

As a result, there is a need for an apparatus capable of receiving degraded data transmission signals operating at high transmission rates and reconstituting the signals to improve their signal quality in a manner that allows the signals to be transmitted over longer distances than is otherwise possible using conventional methods.

Consistent with the principles of the present invention, as embodied and broadly described herein, exemplary embodiments may include an apparatus or method (or one or more subcomponents of such apparatus or method) for receiving a data transmission signal operating at a predetermined transmission rate and generating an improved data transmission signal. Such an apparatus may include a decoding mechanism coupled to the data transmission signal and an external clock reference signal having a predetermined clock rate matching the predetermined transmission rate of the data transmission signal. The decoding mechanism is configured to compensate for amplitude and phase distortions of the data transmission signal, to split the corrected data signal into component data signals, to generate a data clock reference signal based on the data transmission signal and the external clock reference signal and to convert the component data signals into digital component data signals synchronized to the data clock reference signal. The apparatus further includes an encoding mechanism coupled to the decoding mechanism. The encoding mechanism is configured to receive the digital component data signals and the data clock reference signal and to convert the digital component data signals into analog component data signals. The apparatus then selectively outputs at least one of the analog component data signals as the improved data transmission signal.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description of the present invention refers to the accompanying drawings that illustrate exemplary embodiments consistent with this invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the present invention, as described below, may be implemented in many different embodiments of software, firmware, and hardware in the entities illustrated in the figures. The actual software code or specialized control hardware used to implement the present invention is not limiting of the present invention. Thus, the operation and behavior of the present invention will be described with the understanding that modifications and variations of the embodiments are possible, given the level of detail presented herein.

Figure 1:
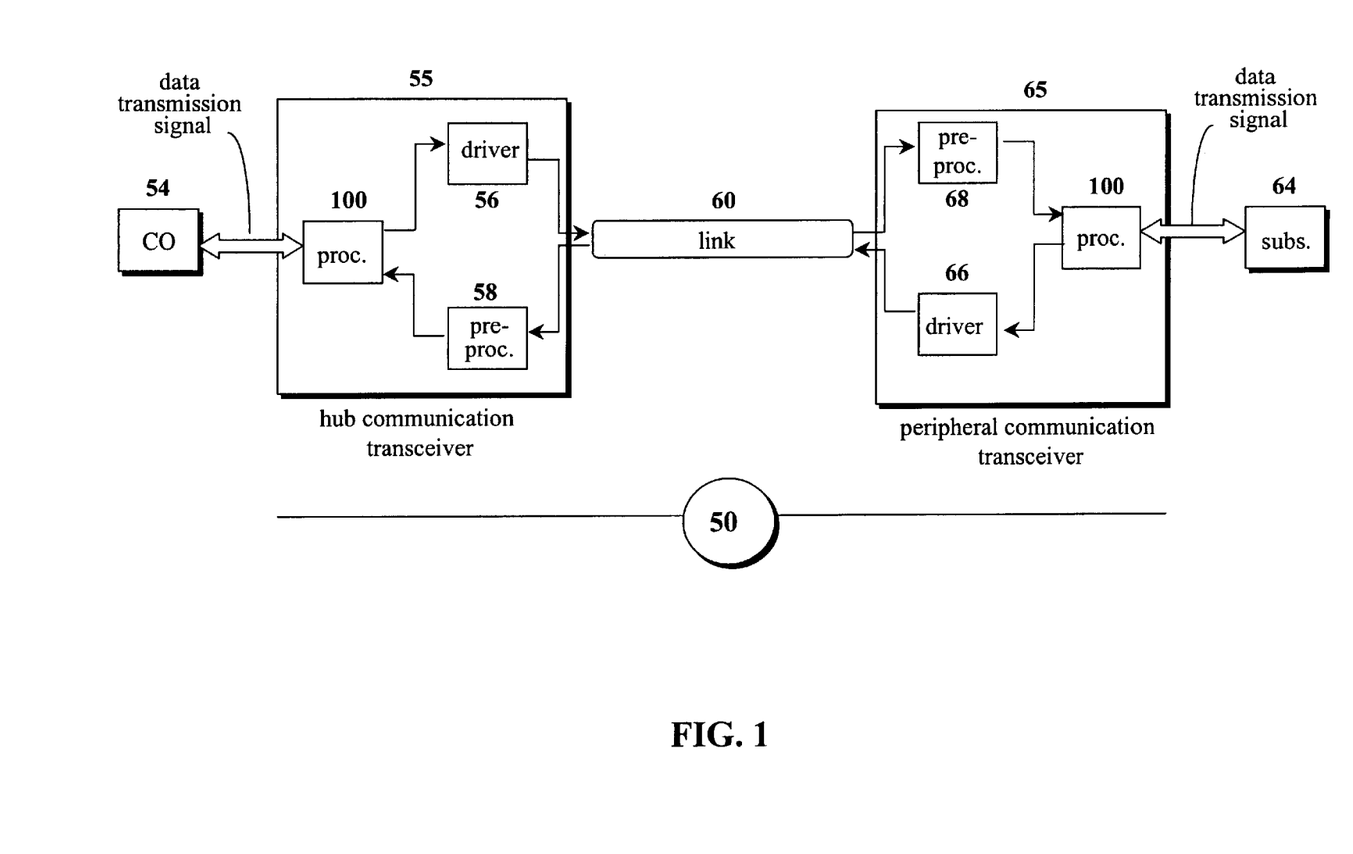
FIG. 1 is a functional block diagram depicting a communications system in accordance with an exemplary embodiment of the present invention.

FIG. 1 illustrates communication system 50 employing apparatus 100, which is constructed and operative in accordance with an embodiment of the present invention. As indicated in FIG. 1, communication system 50 includes a hub communication transceiver 55, which is coupled to a communications link 60, and a peripheral communications transceiver 65, which is also coupled to link 60. Communications link 60 may comprise any conventional communication transmission media, including, but not limited to, unshielded twisted pairs (UTP), coaxial cables, fiber-optic cables, or radiowave (wireless) links. Furthermore, link 60 may span large distances, e.g., distances up to approximately 18,000 ft. or more.

Hub communications transceiver 55 is coupled to a transmission facility conveying a data transmission signal, originating from a common carrier source (e.g., central office, CO) 54 and destined for a subscriber 64, and vice versa. It will be appreciated that data signals may include any information-bearing signal having the information digitally-encoded prior to transmission, such as, for example, pulse code modulated (PCM) signals. Moreover, such signals may be conveyed across the transmission facility with high transmission rates, e.g., of ~45 Mbps (i.e., DS-3~), 155 Mbps (i.e., OC-3), and above.

Hub communication transceiver 55 comprises apparatus 100, which receives the data transmission signal emanating from CO 54. It will be appreciated that, by virtue of transmission across the transmission facility, certain characteristics of the data transmission signal may be degraded (e.g., amplitude attenuation, phase delays, etc.). Apparatus 100 decomposes the potentially degraded data transmission signal into constituent component signals, processes the component signals, and combines the component signals to reconstitute the data transmission signal to an unadulterated form. Hub communication transceiver 55 also comprises a driver mechanism 56, which prepares the unadulterated data transmission signal for transmission across link 60, as well as a pre-processing mechanism 58, which receives the data transmission signal from link 60 and pre-processes it for apparatus 100.

In like fashion, peripheral communications transceiver 65 is coupled to a similar transmission facility conveying the data transmission signal at the same high transmission rate. Peripheral communications transceiver 65 comprises apparatus 100, which receives the potentially degraded data transmission signal emanating from subscriber 64, decomposes the degraded signal into constituent component signals, processes the component signals, and reconstitutes the signal to an unadulterated form. Peripheral communication transceiver 65 also comprises a driver mechanism 66, which prepares the unadulterated data transmission signal for transmission across link 60, as well as a pre-processing mechanism 68, which receives the signal from link 60 and pre-processes it for apparatus 100.

In this configuration, communications system 50 is capable of transporting data transmission signals at high transmission rates with minimal performance degradation across longer distances than is possible using current technology.

Figure 2:
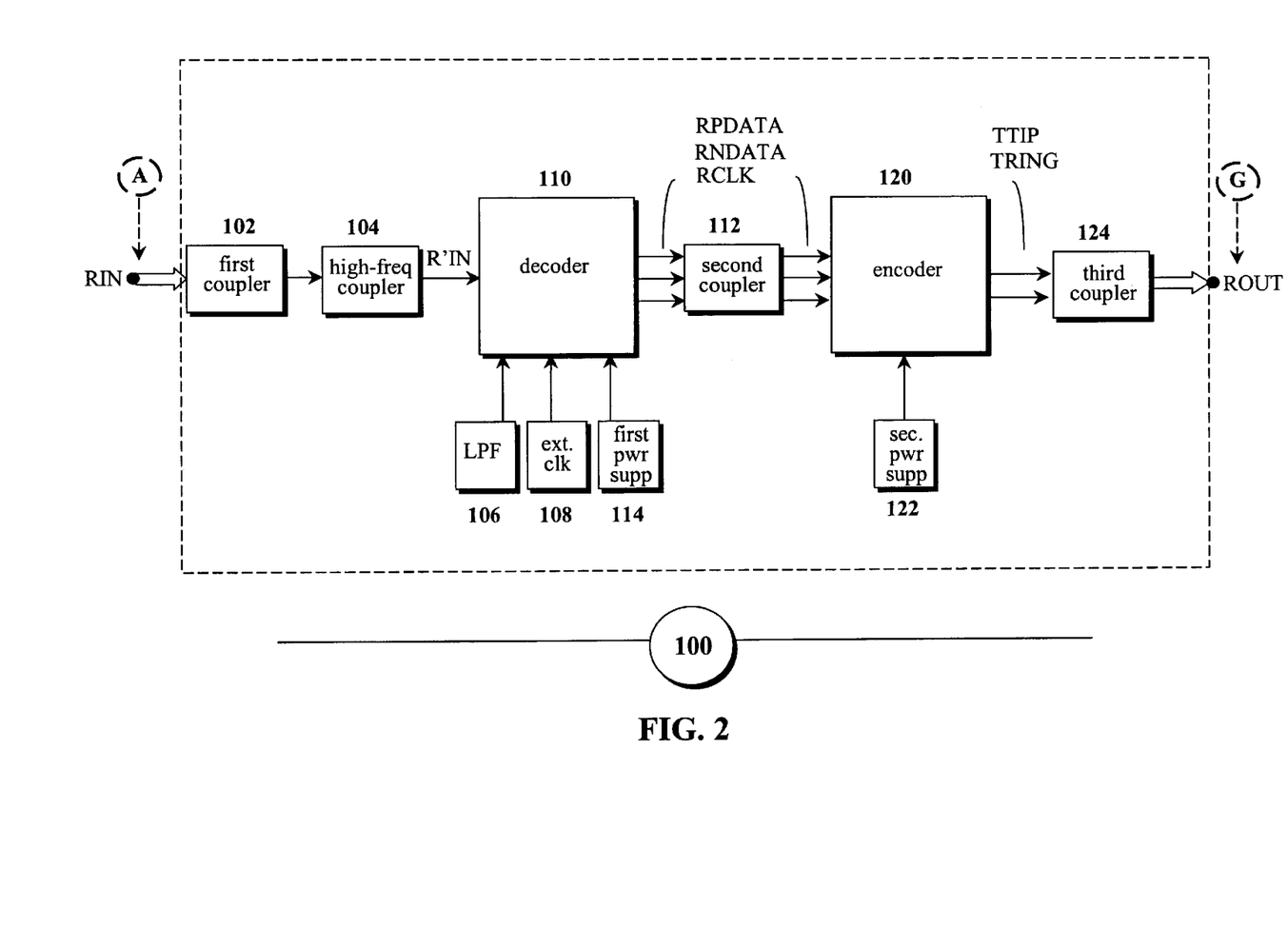
FIG. 2 is a functional block diagram depicting an apparatus in accordance with an exemplary embodiment of the present invention.

FIG. 2 illustrates apparatus 100, which is constructed and operative in accordance with an embodiment of the present invention. As noted above, apparatus 100 receives a potentially degraded data transmission signal and functions to decompose the potentially degraded data transmission signal into constituent component signals, process the component signals and combine the component signals to reconstitute the data transmission signal into a cleaner signal. To achieve such functionality, apparatus 100 implements a first coupler and impedance matching mechanism 102 to receive the potentially degraded data transmission signal RIN conveyed at a high transmission rate across a transmission facility. In the illustrated embodiment, the high-rate data transmission signal comprises a high-rate PCM signal, such as, for example, a DS-3 signal (e.g.,~45 Mbps). A clean DS-3 transmission signal may comprise a time-based waveform as indicated by reference character A in FIG. 5. As is well known in the art, DS-3 signals conveyed over conventional transmission media may be encoded with line codes, such as B3Zs, B8ZS, STS-1, and HDB3, to maintain system synchronization and ensure the integrity of the signal.

Mechanism 102 may incorporate a resistive element to match the impedance of the transmission facility. Mechanism 102 may also employ a transformer to selectively couple data transmission signal RIN onto apparatus 100. The transformer may be configured with a high bandwidth, for example, operating within the approximate range between 10 Mbps to several hundred Mbps, to accommodate a wide variety of transmission rates. The transformer may also be configured to have its primary and secondary windings isolated from ground to prevent noise leakage. In the illustrated embodiment, mechanism 102 may employ a resistive element of, e.g., ~75 ohms and transformer capable of efficiently coupling the data transmission signal and matching the DS-3 transmission facility.

Apparatus 100 may also implement a first high-frequency coupling mechanism 104, which may include a capacitive element. Mechanism 104 may operate to filter the high-frequency components of the data transmission signal RIN, and the capacitive element may be selected to provide an adequate response for the high frequency components of the signal.

Apparatus 100 may further implement a decoder 110, which is configured to generate precise, symmetrical digital data (i.e., square-wave pulse) streams and a data clock signal based on the coupled data transmission signal R'IN. Decoder 110 may be powered by a first power supply circuit 114. It will be appreciated that circuit 114 may be implemented with noise dampening circuitry, such as, for example, filters and beat controllers, to ensure stable and noise-free operation.

Figure 3:
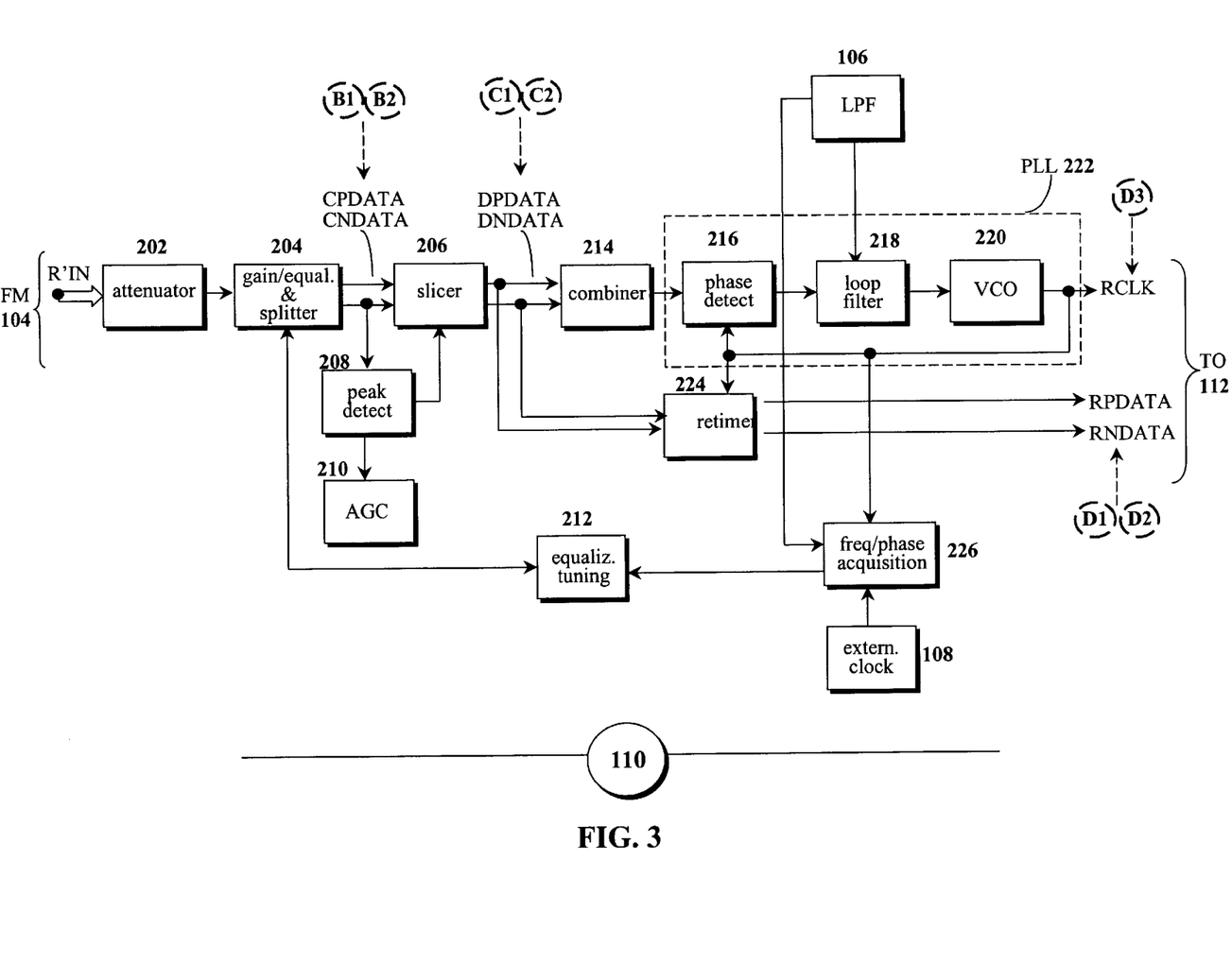
FIG. 3 is a functional block diagram illustrating a decoding portion of the apparatus in accordance with an exemplary embodiment of the present invention.

As indicated in FIG. 3, decoder 110 may incorporate an attenuator 202, coupled to high frequency coupling mechanism 104, to initially adjust the signal level of the coupled data transmission signal R'IN to an adequate level. The output of attenuator 202 may be coupled to gain/equalizing and splitting circuit 204.

Gain/equalizing circuit 204 may receive the attenuated data transmission signal generated by attenuator 202 and may compensate for phase and amplitude distortions attributable to the transmission facility. Gain/equalizing circuit 204 may receive an equalizer tuning signal from equalizer tuning circuit 212 to adaptively adjust the gain and equalizer taps of equalizing circuit 204. In turn, gain/equalizer tuning circuit 212 may receive information from a phase-lock loop 222, which provides feedback control to equalizer tuning circuit 212 (as well as AGC circuit 210 and sampling circuit 206, described below).

Figure 6:
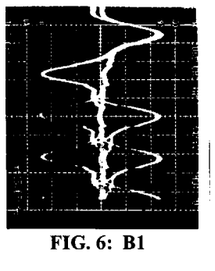
Figure 7:
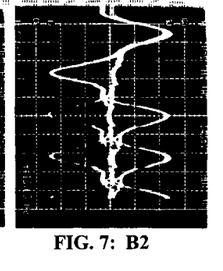

After adjusting for the gain and compensating for the phase and amplitude distortions, gain/equalizing circuit 204 may split the equalized data transmission signal to generate component data signals CPDATA, CNDATA, respectively. Component data signals CPDATA, CNDATA may be generated as replicas of the equalized data transmission signal with the pulses having lower amplitudes than the equalized data transmission signal. Component data signals CPDATA, CNDATA may comprise time-based waveforms as indicated by reference characters B1, B2 in FIGS. 6–7, respectively.

Given the symmetry of the amplitudes of the pulses of component data signals CPDATA, CNDATA, at least one of the component signals may be coupled to peak detector 208. Peak detector 208 may be configured to detect the peaks of either component data signal CPDATA, CNDATA, determine peak amplitude information, and provide the peak amplitude information to an automatic gain control circuit (AGC) 210. AGC 210 may utilize the peak amplitude information to determine how much gain correction should be applied and is configured to generate a gain adjustment signal to slicing circuit 206.

Figure 8:
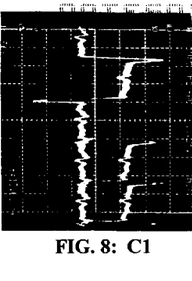
Figure 9:
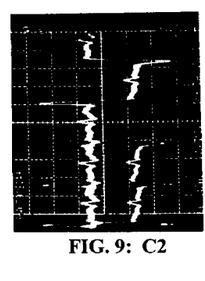

Component data signals CPDATA, CNDATA outputted by gain/equalizing and splitting circuit 204 may be coupled to a slicing circuit 206. Slicing circuit 206 may receive the gain adjustment signal from AGC 210 to effect gain corrections on component data signals CPDATA, CNDATA, and then samples the signals to extract the necessary peak amplitude information to generate digital (i.e., square-wave pulses) component data signals DPDATA, DNDATA. Digital component data signals CPDATA, CNDATA may comprise time-based waveforms as indicated by reference characters C1, C2 in FIGS. 8–9, respectively.

Digital component data signals DPDATA, DNDATA may then be fed to a combining circuit 214, such as, for example, an OR gate, to combine the digital component signals into a composite digital (e.g., non-return to zero (NRZ)) data signal. The composite digital data signal may then be supplied to PLL circuit 222, which may be configured to track the phase of the combined signal. PLL circuit 222 may comprise a phase detector 216, a loop filter 218 and a voltage-controlled oscillator (VCO) 220.

Figure 12:
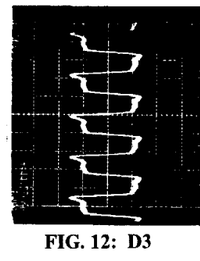

The phase detector 216 may initially detect the phase of the composite digital data signal and combine the phase information with a feedback signal from VCO 220, which carries a frequency and phase estimate, to generate a phase error signal. The phase error signal may then be applied to loop filter 218. Loop filter 218 may include low-pass filter 106 to filter the high frequency noise accompanying the phase error signal. The filtered phase error signal may be supplied to VCO 220. VCO 220 may respond by generating a commensurate phase estimate. As such, phase differences may be tracked by PLL 222 by virtue of having the phase detector 216 detect phase fluctuations, which may then be filtered, supplied to the VCO 220 and fed back to the phase detector 216 to correct the phase differences. As stated above, phase estimate information from VCO 220 may be supplied to the equalizer tuning circuit 212 to provide feedback phase and timing control to gain/equalizer and splitter circuit 204, to sampling circuit 206 and to AGC circuit 210. In addition, the phase estimate information may also be used to generate a stable and reliable data clock signal RCLK, which is synchronized with the digital pulses of the composite digital data signal. Data clock signal RCLK, may comprise the time-based waveform indicated by reference character D3 in FIG. 12.

The phase estimate information may also be supplied to frequency and phase acquisition circuit 226, which may identify the frequency and phase of the composite digital data signal. Frequency and phase acquisition circuit 226 may employ a highly stable external clock reference 108, as well as the data clock signal RCLK generated by VCO 220 of phase lock loop 222, to determine the frequency and phase of the composite digital data signal. It will be appreciated that external clock reference 108 may be implemented with noise and jitter dampening circuitry to ensure a highly reliable, stable, and noise-free clock reference.

Figure 10:
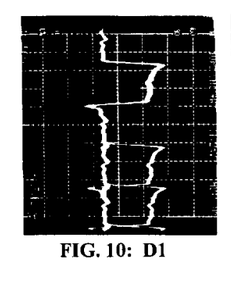
Figure 11:
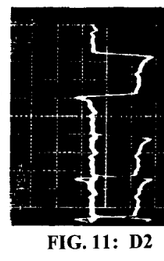

In addition to being fed to the combining circuit 214, digital component data signals DPDATA, DNDATA may also be supplied to a retimer circuit 224. Retimer circuit 224 may force the digital pulses of digital component data signals DPDATA, DNDATA to conform to the timing of the specified transmission rate, based on the data clock signal RCLK generated by the phase lock loop 222, to ensure that the integrity of the timing is maintained. For example, in the illustrated embodiment, the specified transmission rate may be ~45 Mbps, in accordance with the DS-3 transmission facility. In response, retimer circuit 224 may output retimed digital component data signals, RPDATA and RNDATA, respectively, which are synchronized to the data clock signal RCLK operating at a rate of 45 Mbps. Retimed digital component data signals RPDATA, RNDATA may comprise time-based waveforms as indicated by reference characters D1, D2 in FIGS. 10–11, respectively.

In this manner, decoder 110 may receives a potentially degraded data signal R'IN and generates retimed digital component data signals, RPDATA and RNDATA, respectively, as well as a synchronizing data clock signal RCLK.

Returning to FIG. 2, apparatus 100 may further include a second coupling mechanism 112. Coupling mechanism 112 may comprise resistive elements and operates to couple the outputs of decoder 110, namely, retimed digital component data signals RPDATA, RNDATA, and synchronizing data clock signal RCLK, to encoder 120.

Encoder 120 may be configured to generate precise output analog signals based on retimed digital component data signals RPDATA and RNDATA. Encoder 120 may be powered by second power supply circuit 122. It will be appreciated that circuit 114 may be implemented with noise dampening circuitry, such as, for example, filters and beat controllers, to ensure stable and noise-free operation.

Figure 4:
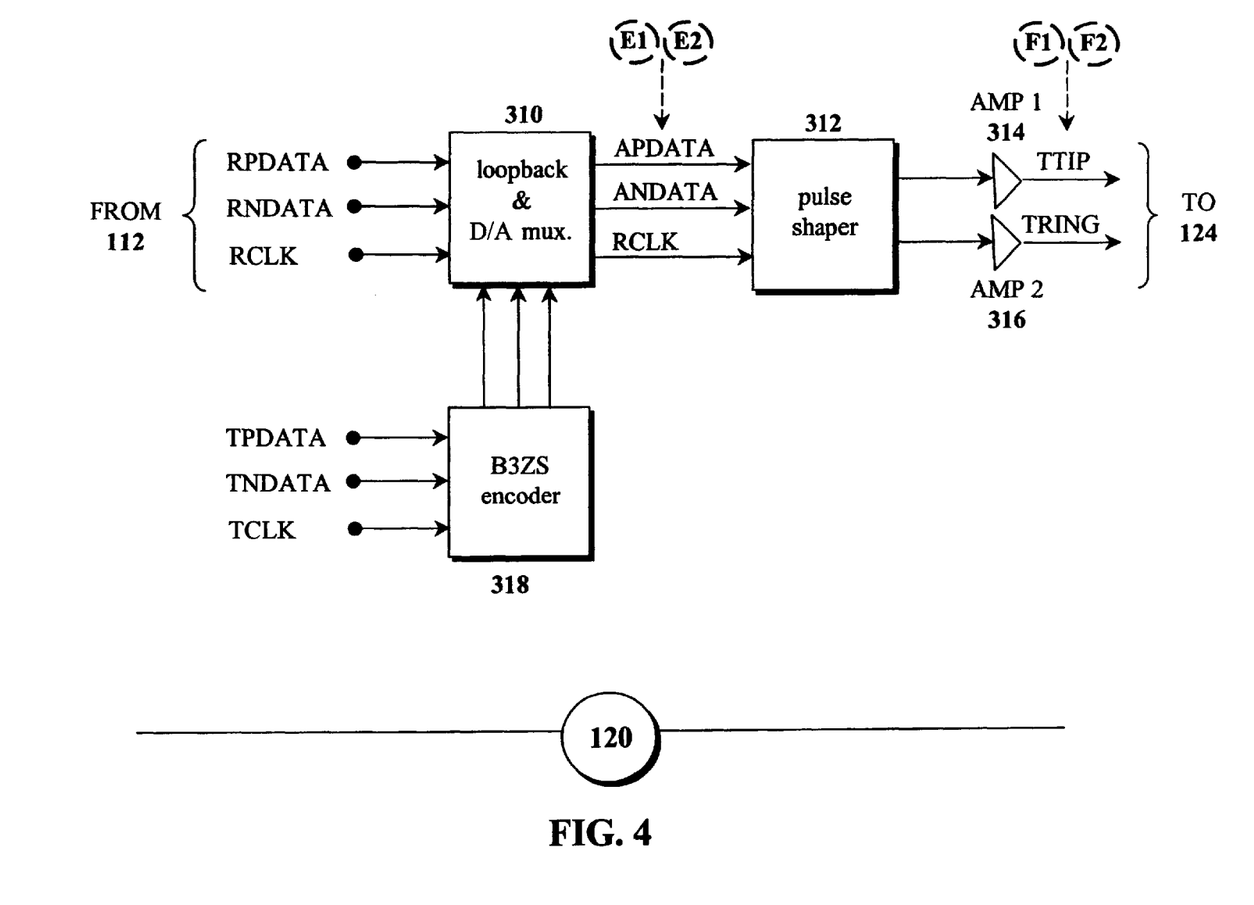
FIG.4 is a functional block diagram illustrating an encoding portion of the apparatus in accordance with an exemplary embodiment of the present invention.
Figure 13:
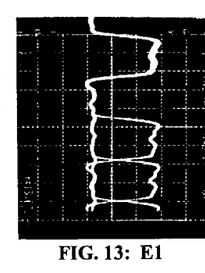
Figure 14:
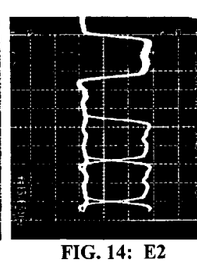

As indicated in FIG. 4, the encoder 120 may incorporate a digital-to-analog multiplexer (D/A MUX) 310. D/A MUX 310 may receive retimed digital component data signals RPDATA, RNDATA, as well as the data clock signal RCLK from second coupling circuit 112 and convert RPDATA, RNDATA into analog component data signals, APDATA and ANDATA, respectively. As such, the digital data pulses conveyed by RPDATA, RNDATA may be converted to sinusoidal pulses. Analog component data signals APDATA, ANDATA may comprise time-based waveforms as indicated by reference characters E1, E2 in FIGS. 13–14, respectively.

D/A MUX 310 may be coupled to pulse shaper 312, which may receive analog component signals, APDATA and ANDATA, as well as clock signal RCLK. Pulse shaper 312 reshapes the analog data waveforms of APDATA and ANDATA to provide precise, synchronized data waveforms in accordance with clock signal RCLK. Pulse shaper 312 may additionally employ gain adjustment mechanisms to adjust the amplitudes of the data waveforms of the APDATA and ANDATA signals.

Figure 15:
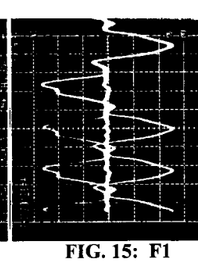
Figure 16:
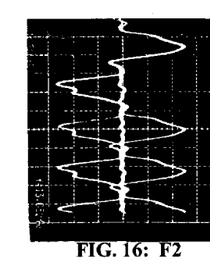

The positive component signal APDATA, bearing the reshaped positive pulses, may be subsequently supplied to AMP1 314, which may amplify the signal to generate a precise output analog signal TTIP. Similarly, negative component signal ANDATA, bearing the reshaped negative pulses, is supplied to AMP2 316, which amplifies the signal to generate a precise output analog signal TRING. Output signals TTIP, TRING may comprise time-based waveforms as indicated by reference characters F1, F2 in FIGS. 15–16, respectively.

In addition, encoder 120 may be configured to incorporate other signals operating at similar rates to the initially coupled data signal R'IN into the output analog signals TTIP, TRING. For example, as indicated in FIG. 3, D/A MUX 310 may be configured to receive external data signals from other sources.

In the illustrated embodiment, external data signals, for example, digital component signals TPDATA, TNDATA and clocking reference TCLK may first be inputted to line code encoder 318, to encode the external data signals with a line code consistent with the line code implemented in the initially coupled data transmission signal R'IN. Line code encoder 318 may incorporate a transmit-all-ones signal (TAOS), which generates continuously alternating pulses to help determine the frequency of the external signals. The external line-encoded digital component signals are furnished to D/A MUX 310, which converts the signals into analog form and then multiplexes the signals with analog component signals APDATA, ANDATA, to generate composite analog component signals. The composite analog component signals may then be supplied to pulse shaper 312 and amplifiers AMP1 314 and AMP2 316, as noted above, to generate output analog signals TTIP and TRING.

Returning to FIG. 2, apparatus 100 may further include a third coupling mechanism 124. Coupling mechanism 124 may selectively couple one of the outputs of encoder 120 (i.e., TTIP or TRING) to a transmission facility comprising link 60. In particular, mechanism 102 may employ a transformer configured to have one of the output analog signals TTIP, TRING connected to ground. The surviving (i.e., ungrounded) output analog signal is then coupled to link 60 as output data transmission signal ROUT. Output data transmission signal ROUT may comprise the time-based waveform indicated by reference character G in FIG. 17.

Figure 5:
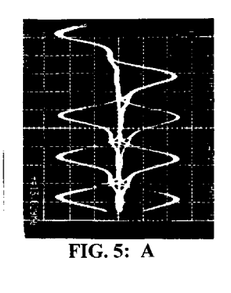
FIGS. 5–17 are diagrams depicting the time-based waveforms of various signals of the apparatus in accordance with an exemplary embodiment of the present invention.
Figure 17:
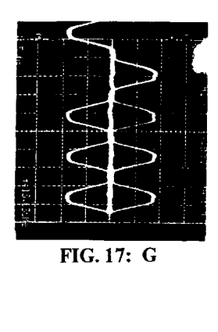

It is to be noted that, upon comparing output data transmission signal ROUT (i.e., waveform G) with input data transmission signal RIN (i.e., waveform A), output data transmission signal ROUT is clearly improved, having cleaner, more precise analog pulses. As a result, output data transmission signal ROUT may be transmitted across link 60 over longer distances than input data transmission signal RIN.

Hence, apparatus 100 is capable of receiving potentially degraded data transmission signals operating at high transmission rates and reconstitutes the signals to improve their signal quality in a manner that allows the signals to be transmitted over longer distances than is otherwise possible using conventional methods.

The foregoing description of the exemplary embodiments provides an illustration and description, but is not intended to be exhaustive or to limit the invention to the precise form disclosed. Modifications and variations are possible consistent with the above teachings or may be acquired from practice of the invention. Thus, it should be noted that the scope of the invention is defined by the claims and their equivalents.

What is claimed:

1. An apparatus for receiving a data transmission signal operating at a predetermined transmission rate and generating an improved data transmission signal, said apparatus comprising:

a decoding mechanism configured to receive said data transmission signal and a clock reference signal having a predetermined clock rate matching said predetermined transmission rate of said data transmission signal, said decoding mechanism being configured to compensate for amplitude and phase distortions of said data transmission signal and produce a corrected data signal, to split said corrected data signal into component data signals, to generate a data clock reference signal based on said data transmission signal and said clock reference signal, and to convert said component data signals into digital component data signals synchronized to said data clock reference signal;

a first coupler and impedance matching mechanism configured to couple said data transmission signal to said decoding mechanism, said first coupler and impedance matching mechanism including a transformer having primary and secondary windings isolated from a ground connection, a resistive element matching the impedance of a transmission facility conveying said data transmission signal, and a high frequency coupling mechanism for filtering said coupled data transmission signal;

an encoding mechanism coupled to said decoding mechanism, said encoding mechanism configured to receive said digital component data signals and said data clock reference signal and to convert said digital component data signals into analog component data signals, wherein said decoding mechanism comprises:

an attenuating mechanism coupled to said first coupler and impedance matching mechanism, said attenuating mechanism configured to initially adjust the amplitude of said coupled data transmission signal to a predetermined level, a gain and equalizing mechanism coupled to said attenuating mechanism, said gain and equalizing mechanism configured to adjust the gain and compensate for amplitude and phase distortions of said coupled data transmission signal, a signal splitting mechanism to split the corrected data transmission signal into component data signals, a slicing mechanism coupled to said gain and equalizing mechanism and said signal splitting mechanism, said slicing mechanism configured to convert said component data signals into digital component data signals, a combiner mechanism coupled to said slicing mechanism, said combiner mechanism configured to combine said digital component data signals into a composite digital data signal, and a phase lock loop mechanism configured to receive said composite digital data signal, lock into a frequency and phase of said composite digital data signal, and generate said data clock reference signal, said phase lock loop mechanism including a phase detector to detect the phase of said composite digital data signal, a loop filter to filter out high frequency noise components of said composite digital signal, and a voltage controlled oscillator for generating said frequency and phase information from said composite digital signal, and wherein said apparatus outputs at least one of said analog component data signals as the improved data transmission signal.

2. The apparatus of claim 1, wherein said decoding mechanism further includes, a peak detection mechanism coupled to at least one of said component data signals for detecting the peak amplitude of one of said component data signals, an automatic gain control mechanism coupled to said peak detector mechanism for dynamically adjusting gain control of said slicing mechanism, a frequency and phase acquisition mechanism coupled to said data clock reference signal from said phase lock loop mechanism and said external clock reference signal, said frequency and phase acquisition mechanism configured to acquire frequency and phase information, an equalizer tuning mechanism coupled to said gain and equalizing mechanism and said frequency and phase acquisition mechanism, said equalizer tuning mechanism configured to receive said frequency and phase acquisition information from said frequency and phase acquisition mechanism and supply said frequency and phase acquisition mechanism to said gain and equalizing mechanism to provide frequency and phase information feedback control.

3. The apparatus of claim 2, wherein said decoding mechanism further includes, a retimer mechanism coupled to said data clock reference signal from said phase lock loop mechanism and said digital component data signals, said retimer mechanism configured to synchronize said digital component data signals to said data clock reference signal.

4. The apparatus of claim 3, further including, a second coupler configured to couple said digital component data signals to said encoding mechanism.

5. The apparatus of claim 4, wherein said encoding mechanism includes, a multiplexer mechanism coupled to said digital component data signals and said data clock reference signal, said multiplexer mechanism configured to multiplex a plurality of digital signals, including said digital component signals, into said analog component signals.

6. The apparatus of claim 5, wherein said encoding mechanism further includes, a pulse shaping mechanism coupled to said digital component data signals, said pulse shaping mechanism configured to improve the shape of data pulses of said analog component signals, and an amplifier coupled to each of said analog component signals, said amplifier configured to amplify each of said analog component signals.

7. The apparatus of claim 6, further including, a third coupler configured to couple said amplified analog component signals to a data transmission facility comprising a link, said third coupler including a transformer configured to selectively couple at least one of said amplified analog component data signals to said data transmission facility as the improved data transmission signal.

8. A communications system employing first and second communications processors disposed respectively at opposite ends of a communications link configured to receive a data transmission signal operating at a predetermined transmission rate and generating an improved data transmission signal to be transmitted across said communications link, said system comprising, a first transceiver disposed at a hub end of said communications link that receives said data transmission signal, said first transceiver including said first communications processor for generating said improved data transmission signal, a first driver mechanism that prepares said improved data transmission signal for transmission across said communications link, and a first pre-processing mechanism that receives said improved data transmission from said communications link and supplying it to said communications processor; and a second transceiver disposed at a peripheral end of said communications link that receives said data transmission signal, said second transceiver including said communications processor for generating said improved data transmission signal, a second driver mechanism that prepares said improved data transmission signal for transmission across said communications link, and a peripheral pre-processing mechanism that receives said improved data transmission from said communications link and supplies it to said communications processor, wherein said each of said communications processors includes, a decoding mechanism that receives said data transmission signal and an external clock reference signal having a predetermined clock rate matching said predetermined transmission rate of said data transmission signal, said decoding mechanism configured to compensate for amplitude and phase distortions of said data transmission signal, to split said corrected data signal into component data signals, to generate a data clock reference signal based on said data transmission signal and said external clock reference signal, and to convert said component data signals into digital component data signals synchronized to said data clock reference signal, and an encoding mechanism coupled to said decoding mechanism, said encoding mechanism configured to receive said digital component data signals and said data clock reference signal and to convert said digital component data signals into analog component data signals, wherein each of said communications processors selectively outputs at least one of said analog component data signals as the improved data transmission signal.

9. The communications system of claim 8, wherein said communications processor further includes, a first coupler and impedance matching mechanism configured to couple said data transmission signal to said decoding mechanism, said first coupler and impedance matching mechanism including a transformer having primary and secondary windings isolated from a ground connection, a resistive element matching the impedance of a transmission facility conveying said data transmission signal, and a high frequency coupling mechanism for filtering said coupled data transmission signal.

10. The communications system of claim 9, wherein said decoding mechanism includes, an attenuating mechanism coupled to said first coupler and impedance matching mechanism, said attenuating mechanism configured to initially adjust the amplitude of said coupled data transmission signal to a predetermined level.

11. The communications system of claim 10, wherein said decoding mechanism further includes, a gain and equalizing mechanism coupled to said attenuating mechanism, said gain and equalizing mechanism configured to adjust the gain and compensate for amplitude and phase distortions of said coupled data transmission signal, and a signal splitting mechanism to split the corrected data transmission signal into component data signals.

12. The communications system of claim 11, wherein said decoding mechanism further includes, a slicing mechanism coupled to said gain and equalizing mechanism and said signal splitting mechanism, said slicing mechanism configured to convert said component data signals into digital component data signals.

13. The communications system of claim 12, wherein said decoding mechanism further includes, a combiner mechanism coupled to said slicing mechanism, said combiner mechanism configured to combine said digital component data signals into a composite digital data signal, and a phase lock loop mechanism configured to receive said composite digital data signal, lock into a frequency and phase of said composite digital data signal, and generate said data clock reference signal, said phase lock loop mechanism including a phase detector to detect the phase of said composite digital data signal, a loop filter to filter out high frequency noise components of said composite digital signal, and a voltage controlled oscillator for generating said frequency and phase information from said composite digital signal.

14. The communications system of claim 13, wherein said decoding mechanism further includes, a peak detection mechanism coupled to at least one of said component data signals for detecting the peak amplitude of one of said component data signals, an automatic gain control mechanism coupled to said peak detector mechanism for dynamically adjusting gain control of said slicing mechanism, a frequency and phase acquisition mechanism coupled to said data clock reference signal from said phase lock loop mechanism and said external clock reference signal, said frequency and phase acquisition mechanism configured to acquire frequency and phase information, an equalizer tuning mechanism coupled to said gain and equalizing mechanism and said frequency and phase acquisition mechanism, said equalizer tuning mechanism configured to receive said frequency and phase acquisition information from said frequency and phase acquisition mechanism and supply said frequency and phase acquisition mechanism to said gain and equalizing mechanism to provide frequency and phase information feedback control.

15. The communications system of claim 14, wherein said decoding mechanism further includes, a retimer mechanism coupled to said data clock reference signal from said phase lock loop mechanism and said digital component data signals, said retimer mechanism configured to synchronize said digital component data signals to said data clock reference signal.

16. The communications system of claim 15, wherein said communications processor further includes, a second coupler configured to couple said digital component data signals to said encoding mechanism.

17. The communications system of claim 16, wherein said encoding mechanism includes, a multiplexer mechanism coupled to said digital component data signals and said data clock reference signal, said multiplexer mechanism configured to multiplex a plurality of digital signals, including said digital component signals, into said analog component signals.

18. The communications system of claim 17, wherein said encoding mechanism further includes, a pulse shaping mechanism coupled to said digital component data signals, said pulse shaping mechanism configured to improve the shape of data pulses of said analog component signals, and an amplifier coupled to each of said analog component signals, said amplifier configured to amplify each of said analog component signals.

19. The communications system of claim 18, wherein said communications processor further includes, a third coupler configured to couple said amplified analog component signals to a data transmission facility comprising a link, said third coupler including a transformer configured to selectively couple at least one of said amplified analog component data signals to said data transmission facility as the improved data transmission signal.

20. An apparatus for transmitting a data transmission signal over a link, said apparatus comprising:

a link having a transmit end and a receive end;

a first communications processor coupled to said transmit end for processing said data transmission signal before being transmitted over said link; and a second communications processor coupled to said receive end for processing said data transmission signal before being received from said link;

said first communications processor comprising:

a first decoding mechanism configured to sample said data transmission signal to be transmitted at a clock rate and timing corresponding to points in time which said data transmission signal changes levels relative to the information being conveyed by said data transmission signal, the data transmission signal samples together forming a digital signal; and a first encoding mechanism configured to receive said digital signal and to convert said digital signal into an analog data signal;

said second communications processor comprising:

a second decoding mechanism configured to sample said data transmission signal to be received at a clock rate and timing corresponding to points in time between which said data transmission signal relative to the information being conveyed by said data transmission signal, the data transmission signal samples together forming a digital signal; and a second encoding mechanism configured to receive said digital signal and to convert said digital signal into an analog data signal.

* * * * *